United States Patent
Lee et al.

(10) Patent No.: US 11,413,928 B2
(45) Date of Patent: Aug. 16, 2022

(54) DOOR OF AIR CONDITIONER FOR VEHICLE

(71) Applicant: Hanon Systems, Daejeon (KR)

(72) Inventors: Jong Min Lee, Daejeon (KR); Jae Woo Ko, Daejeon (KR); Young Keun Kim, Daejeon (KR); Chang Soo Bae, Daejeon (KR); Hwan Kyu Cho, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 210 days.

(21) Appl. No.: 16/660,960

(22) Filed: Oct. 23, 2019

(65) Prior Publication Data

US 2020/0130455 A1    Apr. 30, 2020

(30) Foreign Application Priority Data

Oct. 26, 2018  (KR) ......................... 10-2018-0128961

(51) Int. Cl.
*B60H 1/00* (2006.01)

(52) U.S. Cl.
CPC ....... *B60H 1/00042* (2013.01); *B60H 1/0005* (2013.01); *B60H 1/00021* (2013.01); *B60H 1/00878* (2013.01); *B60H 1/00692* (2013.01); *B60H 2001/00157* (2013.01)

(58) Field of Classification Search
CPC ........ B60H 1/0005; B60H 2001/00092; B60H 2001/00721; B60H 1/00692; B60H 1/00678; B60H 1/00042; B60H 1/00021; B60H 1/00878; B60H 1/00664; B60H 2001/00157; B60H 1/00671; B60H 1/00685; F24F 13/12
See application file for complete search history.

(56) References Cited

U.S. PATENT DOCUMENTS

| 5,722,884 | A | * | 3/1998 | Komowski | F16K 1/22 29/463 |
|---|---|---|---|---|---|
| 6,609,563 | B1 | * | 8/2003 | Tsurushima | B60H 1/00692 165/72 |
| 9,434,234 | B2 | * | 9/2016 | Suzuki | B60H 1/00692 |
| 10,220,669 | B2 | * | 3/2019 | Suzuki | F24F 13/10 |
| 2015/0118948 | A1 | * | 4/2015 | Nakao | B60H 1/00692 454/152 |
| 2016/0001630 | A1 | * | 1/2016 | Nakao | B60H 1/00692 165/42 |
| 2020/0130455 | A1 | * | 4/2020 | Lee | B60H 1/00042 |

OTHER PUBLICATIONS

Honeycombs and Honeycomb Materials Information—Engineering360 (Aug. 2017) (Year: 2017).*

* cited by examiner

*Primary Examiner* — Jenna M Hopkins
(74) *Attorney, Agent, or Firm* — Dickinson Wright PLLC (57) ABSTRACT

A door of an air conditioner for a vehicle, which can prevent damage and distortion by bending during assembly and reinforce strength due to a plate-shaped sliding door with flexibility. The door is disposed inside an air-conditioning case to adjust the degree of opening of an air passageway, and includes a door body formed in a plate shape and formed to be able to slide in the air-conditioning case, and a reinforcing part formed from at least one side of the door body in a thickness direction and extending in an axial direction, which is perpendicular to a sliding direction of the door body.

9 Claims, 6 Drawing Sheets

FIG. 1

PRIOR ART

FIG. 2

PRIOR ART

DOOR OF AIR CONDITIONER FOR VEHICLE

CROSS-REFERENCES TO RELATED APPLICATIONS

This patent application claims priority to Korean Application No. 10-2018-0128961 filed Oct. 26, 2018. The entire disclosure of the above application is incorporated herein by reference.

BACKGROUND OF THE INVENTION

Field of the Invention

The present invention relates to a door of an air conditioner for a vehicle, and more particularly, to a sliding door of an air conditioner, which is disposed inside an air-conditioning case to adjust the degree of opening of an air passageway of air discharged to the interior of the vehicle.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Figure 1:
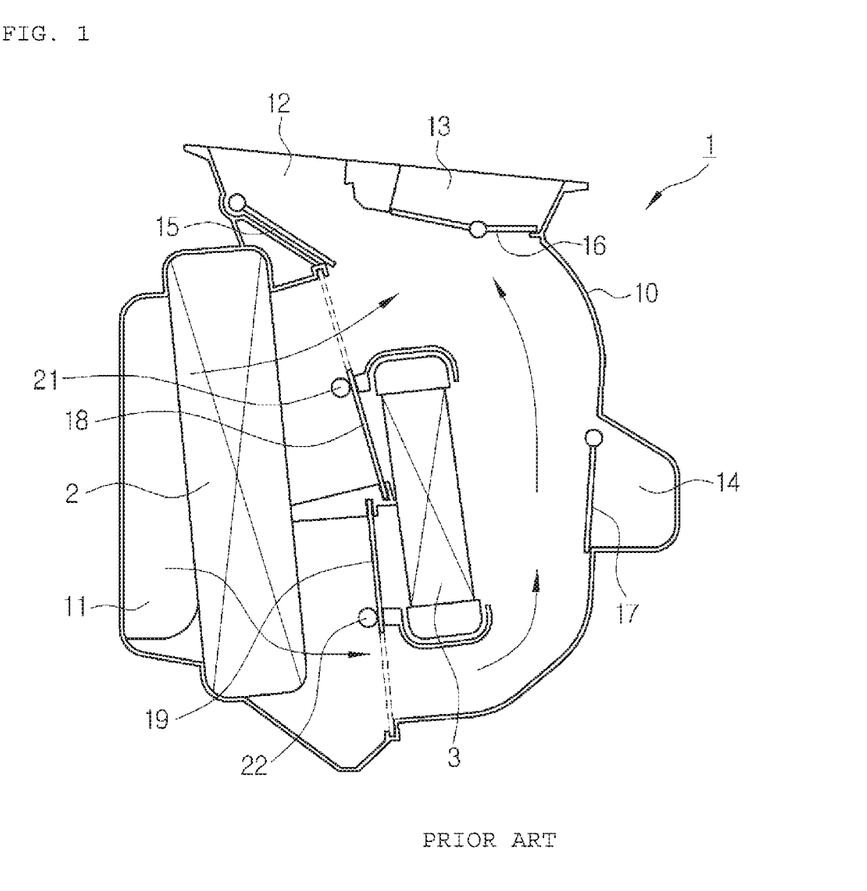
FIG. 1 is a sectional view of a conventional air conditioner for a vehicle.
Figure 2:
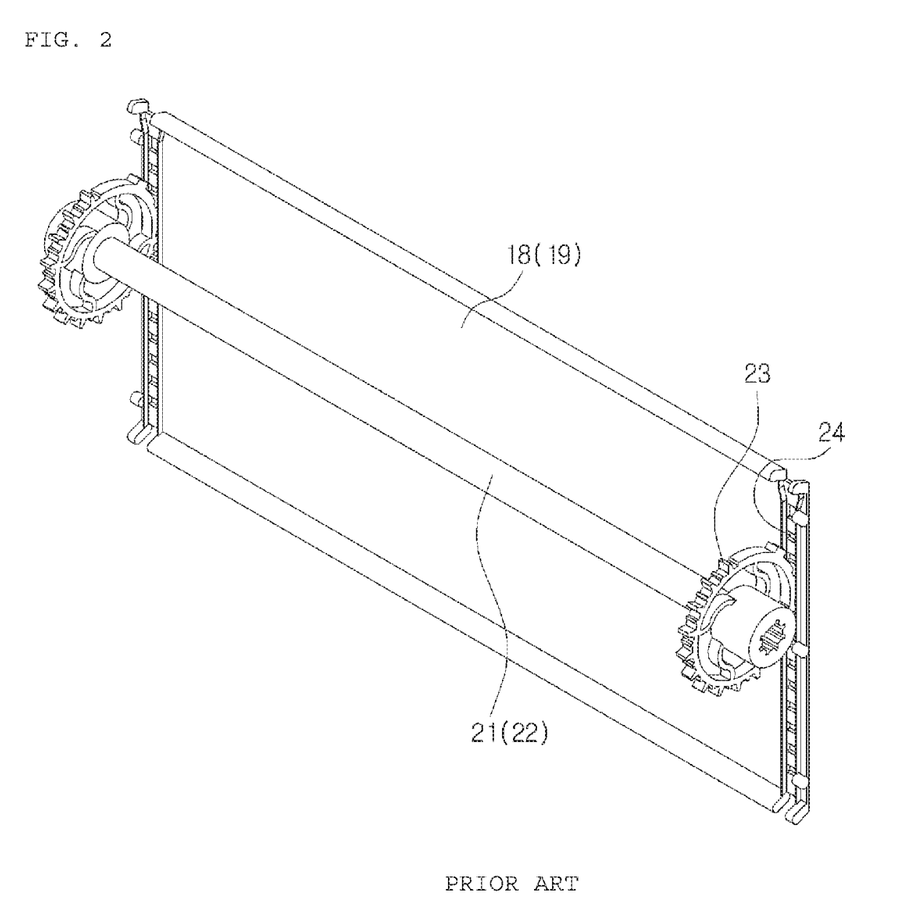
FIG. 2 is a perspective view of a conventional sliding door.

FIG. 1 is a sectional view showing a conventional air conditioner for a vehicle, and FIG. 2 is a perspective view showing a conventional sliding door. As shown in FIGS. 1 and 2, the conventional air conditioner 1 for a vehicle includes an air-conditioning case 10, an air blower (not shown), an evaporator 2, a heater core 3, and temperature adjusting doors 18 and 19.

An air inflow port 11 is formed at an inlet of the air-conditioning case 10, a defrost vent 12, a face vent 13 and a floor vent 14 for adjusting the degree of opening by mode doors 15, 16 and 17 are formed at an outlet of the air-conditioning case 10. The air blower is connected to the air inflow port 11 of the air-conditioning case 10 to blow indoor air or outdoor air.

Moreover, the evaporator 2 and the heater core 3 are mounted inside the air-conditioning case 10 in an air flow direction in order. The temperature adjusting doors 18 and 19 are mounted between the evaporator 2 and the heater core 3 in order to adjust temperature of air discharged to the interior of the vehicle by adjusting the degree of opening of a cold air passageway bypassing the heater core 3 and a warm air passageway passing the heater core 3. Cold air and warm air passing through cold air passageway and the warm air passageway are mixed together in a mixing zone, and then, are selectively discharged to the interior of the vehicle through the vents.

The temperature adjusting door is to selectively adjust the air passing the evaporator toward the heater core or in the direction to bypass the heater core. The temperature adjusting door is a single door formed in a flat door type or a dome door type which is rotated on a rotary shaft. FIG. 1 shows an example of two temperature adjusting doors 18 and 19 disposed in the conventional air conditioner. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

Furthermore, the drawings illustrate the temperature-adjusting door of the air conditioner in order to describe an operational structure of the door, but the door may be another door. Additionally, hereinafter, the temperature-adjusting door is called a 'door'. The first door 18 is connected to a first shaft 21 and slides by rotation of the first shaft 21, and the second door 19 is connected to a second shaft 22 and slides by rotation of the second shaft 22.

The first shaft 21 and the second shaft 22 have gears, and the first door 18 and the second door 19 may have gear grooves engaging with the gears 23 of the first and second shafts 21 and 22. The sliding doors 18 and 19 are formed in an approximately rectangular plate shape with a predetermined thickness, and have gear grooves 24 formed at both sides in a width direction to engage with the gears 23 of the shafts 21 and 22.

The conventional plate-shaped sliding door has several disadvantages in that it may be damaged and due to weak strength and transformation, such as bending or distortion during assembly, since being formed relatively thin, and in that it may causes an air leak by transformation due to weak durability when being used for a long time.

SUMMARY OF THE INVENTION

Accordingly, the present invention has been made to solve the above-mentioned problems occurring in the prior arts, and it is an object of the present invention to provide a door of an air conditioner for a vehicle, which can prevent damage and distortion by bending during assembly and reinforce strength due to a plate-shaped sliding door with flexibility.

To accomplish the above object, according to the present invention, there is provided a door of an air conditioner for a vehicle, which is disposed inside an air-conditioning case to adjust the degree of opening of an air passageway, including: a door body formed in a plate shape and formed to be able to slide in the air-conditioning case; and a reinforcing part formed from at least one side of the door body in a thickness direction and extending in an axial direction, which is perpendicular to a sliding direction of the door body.

Moreover, the reinforcing part comprises first reinforcing parts protruding in the thickness direction of the door body and extending in the axial direction.

Furthermore, each of the first reinforcing parts has an inclined surface with a slope in the thickness direction.

Additionally, each of the first reinforcing part is formed to get thinner from both sides toward a central part in the axial direction.

In addition, the first reinforcing parts are formed at edges of both sides in the sliding direction of the door.

Moreover, shafts are disposed in the air-conditioning case and are connected to the door body to slide the door according to rotation of the shaft and gear parts are formed on one side of the door body to be meshed with the shafts, and the first reinforcing part connects the gear parts to each other in the axial direction.

Furthermore, the reinforcing part comprises second reinforcing parts protruding in the thickness direction of the door body and extending in the axial direction, and being arranged further inside than the first reinforcing parts in the sliding direction.

Additionally, a pair of the second reinforcing parts are disposed at the central part in the sliding direction of the door to be spaced apart from each other at a predetermined interval.

In addition, each of the second reinforcing parts extends from an end portion of one side to an end portion of the other side in the axial direction.

Moreover, the second reinforcing parts are thicker than the first reinforcing parts.

Furthermore, one or more support parts are disposed between a pair of the second reinforcing parts and protrude in the thickness direction to support the second reinforcing parts.

Additionally, the support parts are formed in a hexagonal shape in cross section.

In addition, tension parts having elasticity in the thickness direction are disposed at both sides of the door body in the axial direction, and buffering parts bent in the thickness direction are disposed at both end portions of the door body in the sliding direction.

Moreover, the first reinforcing parts provide the door body with bending flexibility in a diagonal direction.

Furthermore, the central part of the first reinforcing part in the axial direction is located on the same line as a start point of the diagonal line, which is a bending extension line of the door.

In another aspect of the present invention, there is provided an air conditioner for a vehicle including an air-conditioning case and a door disposed inside the air-conditioning case, wherein the door comprises: a door body formed in a plate shape and formed to be able to slide in the air-conditioning case; and a reinforcing part formed from at least one side of the door body in a thickness direction and extending in an axial direction, which is perpendicular to a sliding direction of the door body.

Additionally, the air conditioner for a vehicle further includes a cooling heat exchanger and a heating heat exchanger which are disposed inside the air-conditioning case, wherein the door is a temp door disposed between the cooling heat exchanger and the heating heat exchanger in order to adjust the degree of opening of an air passageway passing the heating heat exchanger and an air passageway bypassing the heating heat exchanger.

The door of the air conditioner for a vehicle according to the present invention can prevent distortion by reinforcing strength of the edge part and also prevent bending deflection of the door and distortion of the entire door during assembly by providing bending flexibility to be flexible in a diagonal direction of the door, thereby greatly enhancing durability.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 3:
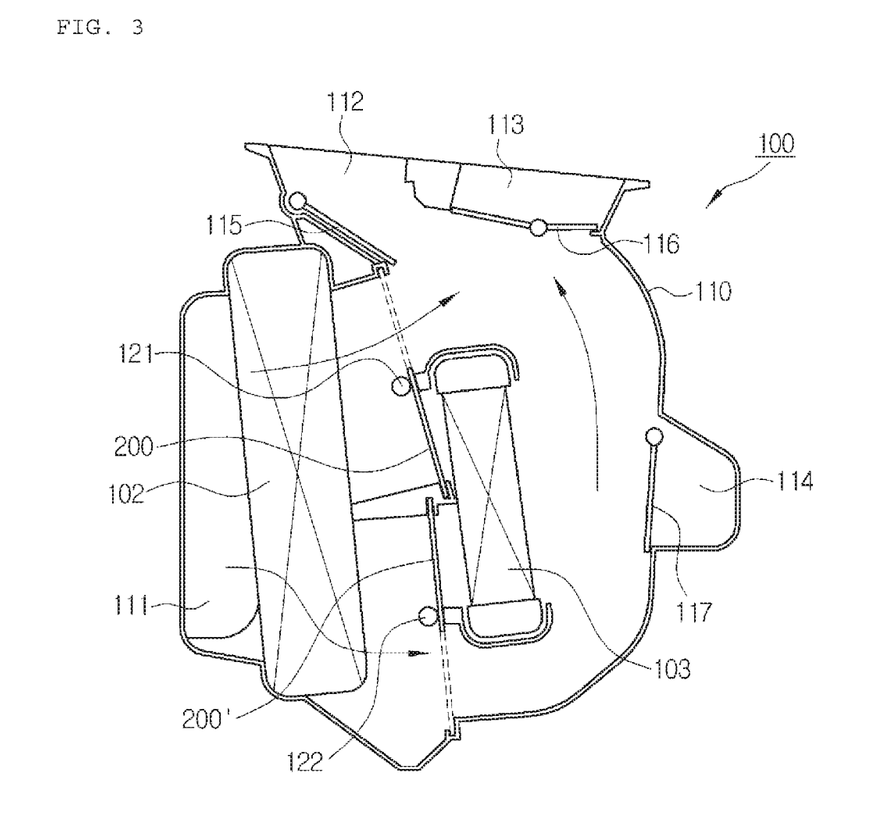
FIG. 3 is a sectional view of an air conditioner for a vehicle according to an embodiment of the present invention.
Figure 4:
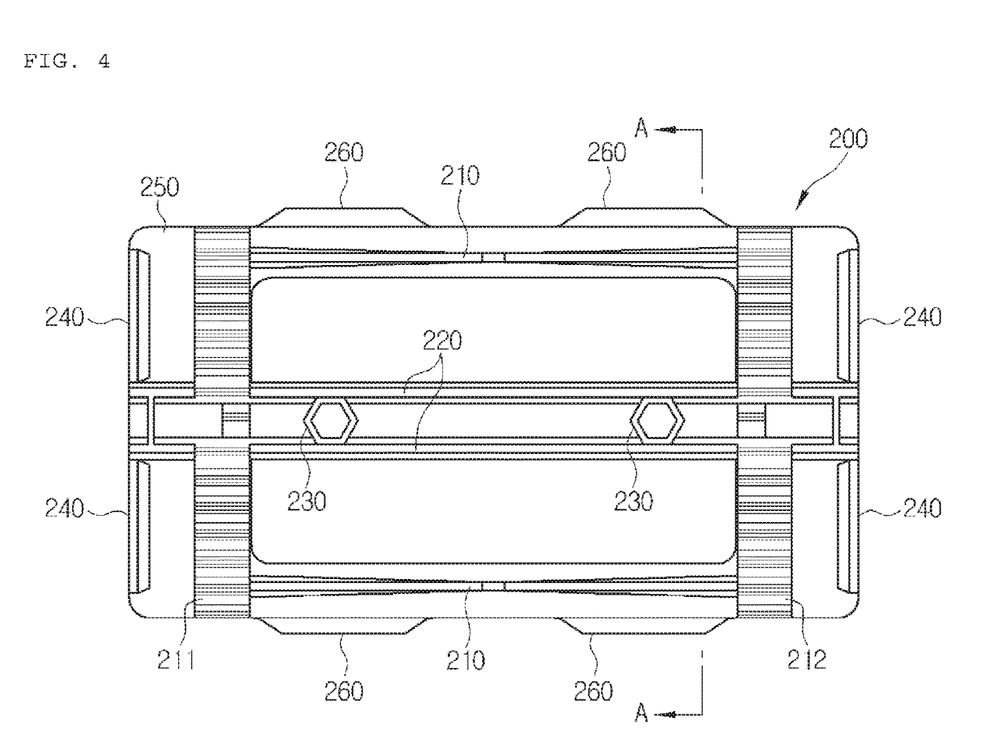
FIG. 4 is a plan view showing a door of the air conditioner for a vehicle according to the embodiment of the present invention.
Figure 5:
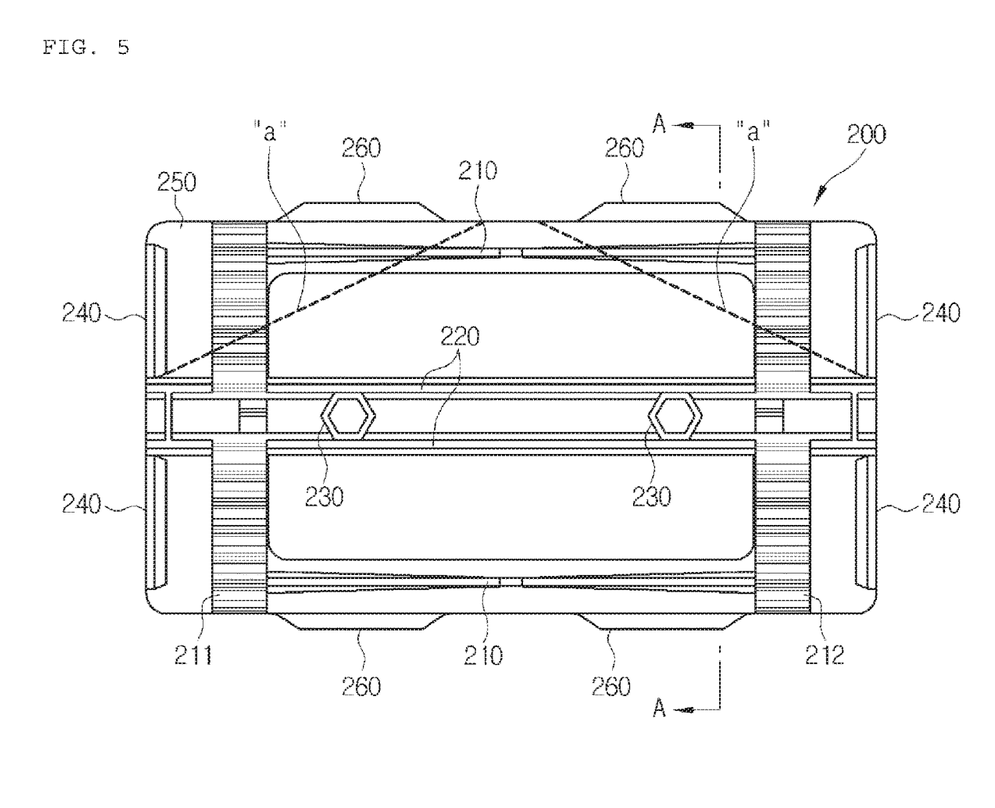
FIG. 5 is a plan view showing a bending extension line of the door of FIG. 4.
Figure 6:
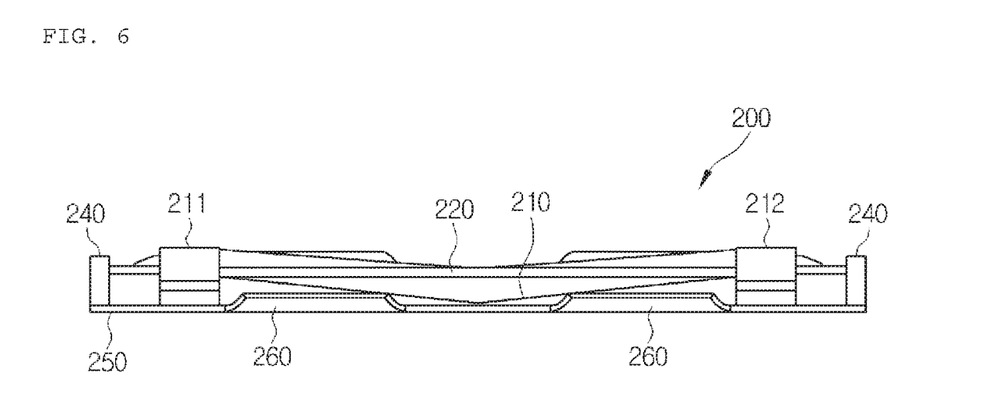
FIG. 6 is a front view showing the door of the air conditioner for a vehicle according to the present invention.
Figure 7:
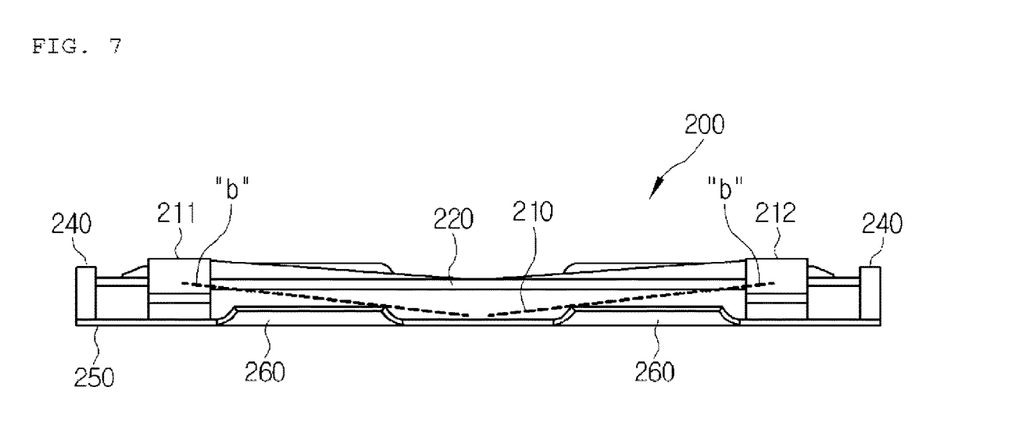
FIG. 7 is a front view showing a slope of an inclined surface of a first reinforcing part of FIG. 6.
Figure 8:
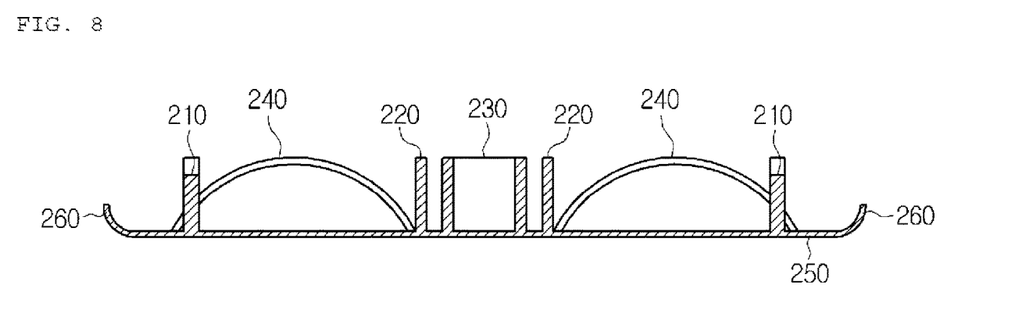
FIG. 8 is a sectional view taken along the line of A-A of FIG. 4.

FIG. 3 is a sectional view of an air conditioner for a vehicle according to an embodiment of the present invention, FIG. 4 is a plan view showing a door of the air conditioner for a vehicle according to the embodiment of the present invention, FIG. 5 is a plan view showing a bending extension line of the door of FIG. 4, FIG. 6 is a front view showing the door of the air conditioner for a vehicle according to the present invention, FIG. 7 is a front view showing a slope of an inclined surface of a first reinforcing part of FIG. 6, and FIG. 8 is a sectional view taken along the line of A-A of FIG. 4.

Hereinafter, in FIG. 4, the right-and-left direction is an axial direction, the vertical direction is a sliding direction, and the protruding direction is a thickness direction.

As shown in FIGS. 3 to 8, the air conditioner 100 for a vehicle according to the embodiment of the present invention includes an air-conditioning case 110, an air blower, and a temp door. A cooling heat exchanger and a heating heat exchanger are disposed inside the air-conditioning case 110 in an air flow direction in order.

The cooling heat exchanger is an evaporator 102 which cools air by exchanging heat between refrigerant of a refrigerant cycle and air, and the heating heat exchanger is a heater core 103 which heats air by exchanging heat between cooling water of a cooling water line and air. The heating heat exchanger may be a heat exchanger using condensation heat of a heat pump system, a PTC heater actuated by electricity, or combination of the components, besides the heater core 103.

An air inflow port 111 is formed at an inlet of the air-conditioning case 110, a defrost vent 112, a face vent 113 and a floor vent 114 for adjusting the degree of opening by mode doors 115, 116 and 117 are formed at an outlet of the air-conditioning case 110. The air blower is connected to the air inflow port 111 of the air-conditioning case 110 to blow indoor air or outdoor air. The evaporator 102 and the heater core 103 are mounted inside the air-conditioning case 110 in the air flow direction in order.

The temp door is mounted between the evaporator 102 and the heater core 103 in order to adjust the degree of opening of an air passageway passing the heater core 103 and the degree of opening of an air passageway bypassing the heater core 103. The temp door includes a first temp door 200 and a second temp door 200' arranged to be spaced apart from each other vertically. Hereinafter, the temp door is called a door 200.

The air conditioner 100 for a vehicle according to the embodiment of the present invention includes two temp doors. As described above, the structure that the temp door has two temp doors vertically may be applied to a structure to send the conditioned air toward the rear seat of the vehicle or a dual-layered structure to divide indoor air and outdoor air and introduce the indoor air or the outdoor air to the interior of the vehicle.

The door 200 is formed in a plate shape, and includes a door body 250. The door body 250 is formed to be able to slide in the air-conditioning case 110. A shaft is disposed in the air-conditioning case 110. The shaft is connected to the door body 250 to slide the door inside the air-conditioning case 110 by rotation of the shaft. The shaft includes a first shaft 121 and a second shaft 122 which are respectively connected to the first temp door and the second temp door.

The door 200 includes a reinforcing part. The reinforcing part is formed on at least one side of the door body 250 in the thickness direction and extends in the axial direction. The axial direction is perpendicular to the sliding direction of the door. The reinforcing part includes first reinforcing parts 210, second reinforcing parts 220, and support parts 230.

The first reinforcing parts 210 protrude in the thickness direction of the door body 250 and extend in the axial direction. Referring to FIG. 7, each of the first reinforcing part 210 has an inclined surface with a slope (b) in the thickness direction. The slope (b) is illustrated by a dotted line. The first reinforcing parts 210 protrude in the thickness direction, and the protruding length is formed to be reduced toward the central part from both sides in the axial direction. That is, the first reinforcing part 210 is formed to get thinner toward the central part from both sides in the axial direction.

As described above, through the structure that the first reinforcing parts 210 protrude in the thickness direction to be inclined and extend in the axial direction, bending flexibility is provided at a diagonal part (a) as illustrated by the dotted line in FIG. 5. Therefore, power of more than a predetermined level is applied to prevent the door from being damaged by bending deflection when the door is assembled.

The first reinforcing parts 210 are formed at both edges in the sliding direction of the door. The above structure can prevent distortion by reinforcing strength of the edge parts of the door 200 and make the door flexible in the diagonal direction (a). In this instance, the central part of the first reinforcing part 210 in the axial direction is located on the same line as a start point of the diagonal line (a), which is a bending extension line, and bending flexibility is increased more since the slope of the diagonal line (a) increases as the first reinforcing part 210 is arranged toward the edge parts.

Gear parts 211 and 212 which are meshed with the shaft are formed on one side of the door body 250. The first reinforcing parts 210 are formed to extend between the gear part 211 at one side and the gear part 212 at the other side in the axial direction. That is, the first reinforcing parts 210 connect the gear parts 211 and 212 with each other in the axial direction. Therefore, the gear parts 211 and 212 are supported by the first reinforcing parts 210 in the axial direction so as to prevent distortion.

The second reinforcing parts 220 protrude in the thickness direction of the door body 250 and extend in the axial direction. The second reinforcing parts 220 are arranged further inside than the first reinforcing parts 210 in the sliding direction. A pair of the second reinforcing parts 220 are disposed to be spaced apart from each other at a predetermined interval. Preferably, the second reinforcing parts 220 are arranged at the central part in the sliding direction of the door.

The second reinforcing parts 220 serve to prevent distortion of the entire door 200 and serve as the support part of the diagonal line (a), which is the bending extension line illustrated in FIG. 5, so as to prevent excessive bending of the door 200. That is, the first reinforcing parts 210 provide diagonal bending flexibility of the door, and the second reinforcing parts 220 serve as a bending limit line.

More preferably, the second reinforcing parts 220 are arranged at the central part in the sliding direction. Both end portions of the second reinforcing parts are end points of the diagonal line (a), which is the bending extension line, and the slope of the diagonal line (a) is increased as the second reinforcing parts 220 are arranged at the central part, so that bending flexibility gets more increased.

Furthermore, the second reinforcing parts 220 are thicker than the first reinforcing parts 210. Additionally, each of the second reinforcing parts 220 extends from ab end portion of one side to an end portion of the other side in the axial direction. Therefore, the ends of the door body 250 in the sliding direction are bent more than the central part to raise bending flexibility and to improve distortion prevention effect more.

The support parts 230 are disposed between a pair of the second reinforcing parts 220 and protrude in the thickness direction to support the second reinforcing parts 220. One or more support parts 230 may be disposed. The support parts 230 are located between a pair of the second reinforcing parts 220 to support the two second reinforcing parts 220 and restrain distortion of the door in the thickness direction. The support parts 230 have a hexagonal shape in cross section. The hexagonal shape is structurally stable and provides high strength.

In the meantime, tension parts 240 having elasticity in the thickness direction are disposed at both sides of the door body 250 in the axial direction. The tension parts 240 reinforce strength of the door 200 and enhances sealability by bringing the door 200 closer to the air-conditioning case 110 in the thickness direction during assembly of the door.

Moreover, buffering parts 260 bent in the thickness direction are disposed at both end portions of the door body 250 in the sliding direction. The buffering parts 260 provide a buffering function between the door 200 and the air-conditioning case 110 during assembly or operation of the door.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. A door of an air conditioner for a vehicle, which is disposed inside an air-conditioning case to adjust the degree of opening of an air passageway, the door of the air conditioner comprising:
   a door body formed in a plate shape and formed to be able to slide in the air-conditioning case;
   a plurality of reinforcing parts formed from at least one side of the door body in a thickness direction and extending in an axial direction, which is perpendicular to a sliding direction of the door body;
   wherein the plurality of reinforcing parts includes a pair of first reinforcing parts protruding in the thickness direction of the door body and extending in the axial direction;
   wherein each of the first reinforcing parts has an inclined surface with a slope in the thickness direction, and is formed to get thinner in the thickness direction as the inclined surface extends from one of the sides toward a central part in the axial direction, thereby having flexibility and preventing the door from being damaged by bending deformation when the door is coupled to the air-conditioning case.

2. The door of the air conditioner according to claim 1, wherein the first reinforcing parts are formed at edges of both sides in the sliding direction of the door.

3. The door of the air conditioner according to claim 1, wherein shafts are disposed in the air-conditioning case and are connected to the door body to slide the door according to rotation of the shaft, and gear parts are formed on one side of the door body to be meshed with the shafts, and wherein the first reinforcing parts connect the gear parts to each other in the axial direction.

4. A door of an air conditioner for a vehicle, which is disposed inside an air conditioning case to adjust a degree of opening of an air passageway, the door of the air conditioner comprising:

a door body formed in a plate shape and formed to be able to slide in the air-conditioning case in a sliding direction;

a plurality of reinforcing parts formed from at least one side of the door body in a thickness direction and extending in an axial direction which is perpendicular to the sliding direction of the door body;

wherein the plurality of reinforcing parts includes a pair of first reinforcing parts protruding in the thickness direction of the door body and extending in the axial direction;

wherein the plurality of reinforcing parts further includes a pair of second reinforcing parts protruding in the thickness direction of the door body at a central part of the door body in the sliding direction and extending in the axial direction, and being arranged between the first reinforcing parts in the sliding direction, and wherein the second reinforcing parts are spaced from each other in the sliding direction at a predetermined interval;

wherein at least one elongated support part is disposed between, and is at least partially aligned with the pair of the second reinforcing parts in the sliding direction and protrudes in the thickness direction to support the second reinforcing parts and restrain distortion of the door in the thickness direction.

5. The door of the air conditioner according to claim 4, wherein each of the second reinforcing parts extends from an end portion of one side to an end portion of the other side in the axial direction.

6. The door of the air conditioner according to claim 4, wherein the second reinforcing parts are thicker than the first reinforcing parts.

7. The door of the air conditioner according to claim 4, wherein the supports parts are formed in a hexagonal shape in cross section.

8. The door of the air conditioner according to claim 1, wherein tension parts having elasticity in the thickness direction are disposed at both sides of the door body in the axial direction, and buffering parts bent in the thickness direction are disposed at both end portions of the door body in the sliding direction.

9. The door of the air conditioner according to claim 1, wherein the central part of each of the first reinforcing parts is located in the axial direction adjacent to a start point of a diagonal bending extension line of the door, and wherein the bending extension line extends from an end of the door in the sliding direction to an edge of the door in the axial direction.

* * * * *